(No Model.)

L. S. KEAGLE.
DENTAL POLISHING CHUCK.

No. 540,258. Patented June 4, 1895.

Attest
F. J. Kubicek
Jos. Kubicek

Inventor
Levi S. Keagle,
By J. M. St. John,
Atty.

UNITED STATES PATENT OFFICE.

LEVI S. KEAGLE, OF VINTON, IOWA.

DENTAL POLISHING-CHUCK.

SPECIFICATION forming part of Letters Patent No. 540,258, dated June 4, 1895.

Application filed February 6, 1895. Serial No. 537,552. (No model.)

*To all whom it may concern:*

Be it known that I, LEVI S. KEAGLE, a citizen of the United States, residing at Vinton, in the county of Benton and State of Iowa, have invented certain new and useful Improvements in Dental Polishing-Chucks; and I do hereby declare the following to be a full, clear, and exact description of the invention, such as will enable others skilled in the art to which it appertains to make and use the same.

The object of this invention is to provide a dentist's lathe with a simple and quickly operated chuck for holding a strip of sand-paper, or other suitable abrading material, for the grinding and polishing of plates, and other operations of that nature, now commonly performed by hand. A full and particular description of the chuck for this purpose will be hereinafter set forth, reference being had to the accompanying drawings, in which—

Figure 1:
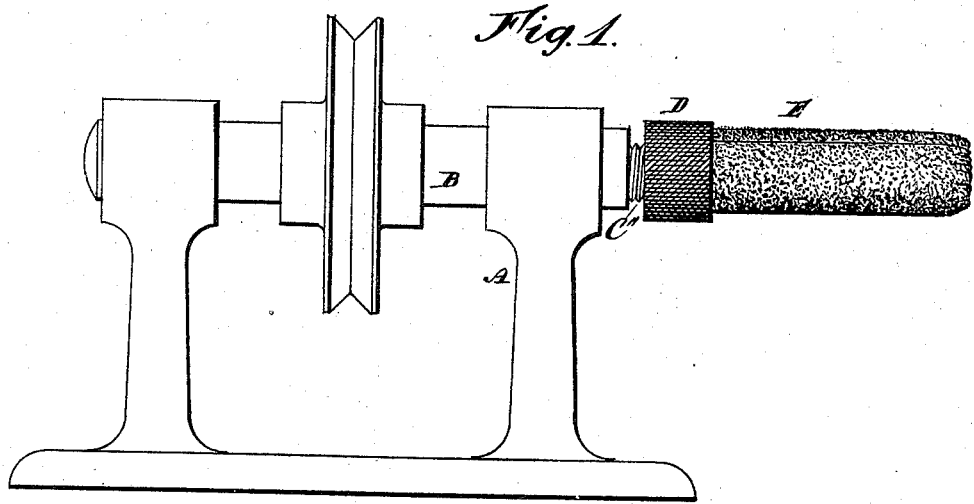
Figure 2:
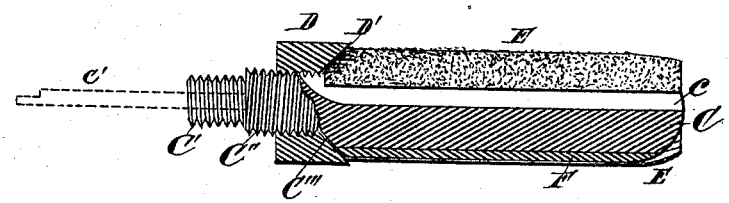
Figure 3:
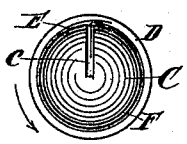

Figure 1 is a side elevation of a chuck embodying my invention as applied to an ordinary dental lathe. Fig. 2 is a central longitudinal section of the chuck, the screws being but partially in section. Fig. 3 is an elevation of the chuck as seen from the outer end.

Similar letters of reference indicate corresponding parts.

Referring to the drawings, A designates the head-block of a simple lathe, or grinder, and B the mandrel of the same. To this mandrel is attached, as by screwing into it, the chuck C. This is a cylindrical piece of iron or steel, provided with a longitudinal slot c, with a suitable shank, the screw C' for example, for attachment to the mandrel. Between this shank and the body of the chuck is another screw C'', which should be the reverse of that on the shank, for reasons which will appear hereinafter. To this screw C'' is fitted a circular nut D, suitably milled on the periphery, and having a conically concave face adjoining the body of the chuck. This face of the nut abuts upon a conical shoulder C''' formed on the chuck.

The body of the chuck which may be designated as the spindle should be covered with some yielding material, F, such as leather or felt.

The operation of the chuck is as follows: The nut D is screwed back toward the head-block A, so as to leave the conical shoulder C''' exposed. A piece of sand-paper, emery cloth, or the like, long enough to a little more than encircle the spindle and of about the same length as the spindle, is then wrapped around the spindle, one edge being inserted in the slot for convenience in this operation. The inner end of the abrading material should project a short distance past the conical shoulder. In this position it is held by one hand, and with the other the operator screws up the nut D, the conical face of which draws in the circular edge of the abrading strip and finally presses it firmly against said conical shoulder.

The chuck should of course revolve in a direction opposite to that in which the abrading strip is wound on it, that is to say, in the direction indicated by the arrow in Fig. 3. Contact of the work to be ground or polished would in this case tend to turn the chuck in the opposite direction thus screwing the chuck into instead of out of the mandrel, with a "right-hand" screw on the shank; but as the same operation would tend to unscrew the holding nut, if provided with a right-hand thread, it is preferable to make this left-handed, as shown.

Though desirable, for the reason stated above, the slot c is not indispensable, as the nut will hold the abrading material when once in position, for the light work ordinarily required of it. It is evident, however, that the slot assists in holding the abrading material, as well as facilitates the attachment of the same to the chuck.

The outer end of the spindle is rounded as shown, to give a suitable polishing surface to operate in the cavities of the plate. The abrading material takes the form of the spindle when brought in contact with the plate, being necessarily wrinkled somewhat as shown. This does not, however, impair its efficiency.

By making the shank to fit the hand-piece of a dental engine, as indicated by the dotted lines lettered c' in Fig. 2, the device may be used in connection with the engine instead of the lathe, and for polishing bridges, tooth crowns, and the like. In this case the polishing portion of the chuck need not of course be as large nor as long as for a lathe.

Having thus described my invention, I claim—

In a dental polishing chuck, the combination of the slotted, cylindrical, spindle C, rounded at the outer end and having shank C', screw thread C'' and conical shoulder C''', the covering of yielding material F, the conically concave-faced nut D and the abrading strip E, all substantially as and for the purpose set forth.

In testimony whereof I affix my signature in presence of two witnesses.

LEVI S. KEAGLE.

Witnesses:
CHAS. H. PRAY,
WILLIAM B. PATERSON.